Jan. 8, 1929.  1,697,848
S. E. BOYNTON
BEARING AND METHOD OF PRODUCING IT
Filed Nov. 10, 1925

Inventor
Stanley E. Boynton
by
Att'y.

Patented Jan. 8, 1929.

1,697,848

UNITED STATES PATENT OFFICE.

STANLEY EDWARD BOYNTON, OF OAK PARK, ILLINOIS, ASSIGNOR TO WESTERN ELECTRIC COMPANY, INCORPORATED, OF NEW YORK, N. Y., A CORPORATION OF NEW YORK.

BEARING AND METHOD OF PRODUCING IT.

Application filed November 10, 1925. Serial No. 68,074.

This invention relates to bearings and methods of producing them, and more particularly to a bearing for multiple high speed drill spindles and a method of producing such a bearing.

The primary objects of this invention are the provision of a bearing for elements mounted on close centers and a method of producing such a bearing in an efficient, practical and expeditious manner.

In accordance with one embodiment of this invention, the above objects are accomplished by the formation of bearings especially adapted to multiple drill spindle units in which the spindles are supported by bearing material applied while molten to substantially enclose the drill spindles having only grooves at separated points for each spindle to allow for lubrication.

Specifically, this invention contemplates the provision of a pair of metal frames open at opposite sides and arranged one within the other, the ends of the frames being provided with apertures arranged upon the desired centers for mounting the drill spindles with one of the spindles projecting from the outer frame for connection to a suitable source of motive power, the portions of the spindles within the inner frame carrying a plurality of intermeshing gears for driving the spindles one from the other. Upon being thus assembled the space between the outer and inner frames is filled with a suitable bearing material, such as Babbitt metal, so that the shafts are completely surrounded with the metal except for grooves provided for lubrication and the portions carrying the gears within the inner frame.

Figure 1:
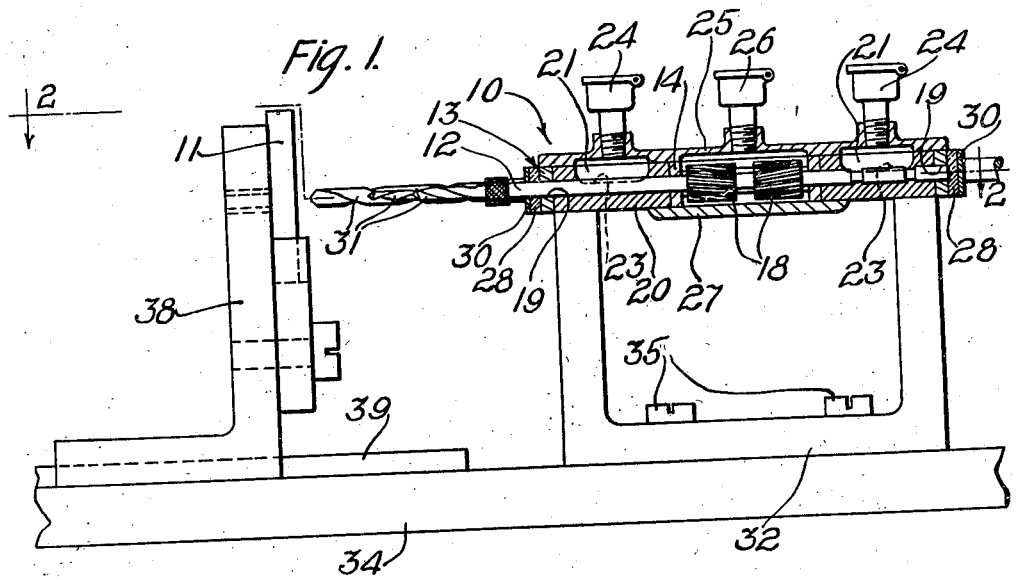
Figure 2:
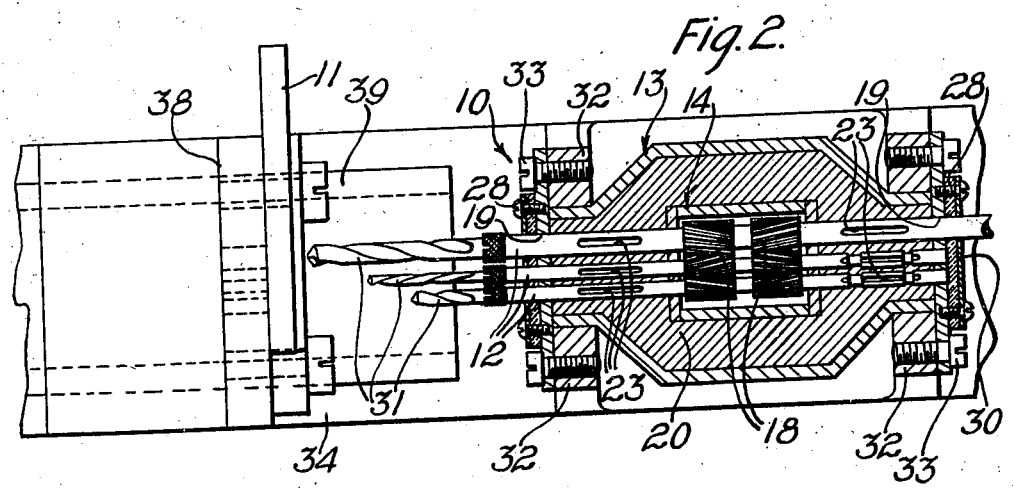

Other objects and advantages of this invention will more fully appear from the following detailed description taken in connection with the accompanying drawings which illustrate one embodiment of this invention, in which Fig. 1 is a side view partly in section illustrating a multiple high speed drill spindle unit embodying the features of this invention, and Fig. 2 is a plan sectional view taken upon the line 2—2 thereof looking in the direction of the arrows.

Referring to Fig. 1 of the drawing, 10 indicates a multiple high speed drill spindle unit provided with bearings constructed in accordance with the method of this invention. The unit 10 as illustrated is for the purpose of drilling three openings of different diameters arranged upon close centers and upon a common horizontal plane in a wood panel indicated at 11. Drill spindles 12 are rotatably journaled upon the desired centers in the following manner: Outer and inner frames 13 and 14 each comprising a plurality of metal strips suitably secured together, preferably by electric welding, provide centering means for the spindles 12.

The spindles 12 each carry a pair of herring-bone gears 18 intermediate their ends, the gears being positioned within the inner frame 14 in intermeshing relationship in a well known manner, with the spindle 12 of greatest diameter projecting through the outer frame 13 at the right end thereof and connected to a suitable source of motive power (not shown). The end pieces of the frames 13 and 14 are provided with aligned apertures 19 arranged upon the desired drill centers with each series of aligned apertures 19 formed in the four end pieces corresponding in diameter to the diameter of the spindle 12 mounted therein. The drill spindles 12 may be assembled in the frame 14 by passing the left ends of the spindles through the apertures of the left end piece thereof before the right end piece is secured in position and thereafter completing the frame by welding the right end piece in position. The same method is followed in mounting the spindles 12 with the inner frame 14 carried thereon in the outer frame 13 and finally welding the right end piece thereof in position, thereby locking the two frames and the spindles together. Thereafter the frames 13 and 14 are placed upon a flat metal plate (not shown) with an open side thereof facing upwardly, the inner frame is centered with respect to the end pieces of the outer frame 13 and molten Babbitt metal, indicated at 20, is then poured into the space between the inner and outer walls of the frames 13 and 14, respectively, to fill the entire space and completely surround the portions of the drill spindles 12 between the two frames with the Babbitt metal. The fit of the spindles 12 within the apertures 19 of the end pieces is such that substantially no clearance is provided therebetween, with the result that the molten Babbitt metal will not escape into the space provided by the inner frame. Before pouring the molten babbitt the portions of the spindles between the two frames are coated with a thin layer of graphite or other suitable material (not shown) to provide a suitable clearance between the spindles and the bearing metal for lubrication purposes.

After sufficient cooling, slots 21 are formed in the Babbitt metal in vertical and parallel alignment with the axes of the spindles 12, preferably by using a milling cutter which is run through the babbit and into engagement with the spindles to cause slight depressions 23 in the spindles, as clearly shown in Fig. 2 of the drawing. The slots 21 and depressions 23 are for the purpose of permitting lubricant to be supplied to the spindles from suitable oil receptacles 24 mounted in a plate 25 fixed to the upper face of the unit. An oil receptacle 26 is also provided for lubricating the gears 18, and a plate 27 secured to the under face of the unit prevents the dripping of the lubricant therefrom. Felt pads 28 pressed against the outer faces of the end pieces of the outer frame 13 and retained in position by metal plates 30 prevent the lubricant from dripping from the spindles 12. Suitable drills 31 are mounted in a well known manner upon the left ends of the spindles 12.

The unit 10 is secured to a supporting frame 32 by screws 33 (Fig. 2) while the frame 32 is secured to a bed plate or bench top 34 by screws 35. A work carrier is indicated at 38 for holding the panel 11 during the drilling operation, the carrier being reciprocably mounted upon a slideway 39 fixed to the bench top 34.

In multiple high speed drill spindle units wherein the spindles are mounted upon close centers it is essential that ample bearing surface be provided to dissipate the heat generated by the high speed spindles, which heat at times is excessive, otherwise the bearings will burn out and thereby result in periods of idleness for the mechanism. By using the above described bearings embodying features of the invention and produced by the method hereinbefore described, any excessive heat which may be generated is readily dissipated. This result is due to the complete surrounding of the spindles with bearing metal and the large body of metal integral therewith in conjunction with the provision for lubricating the bearings. Furthermore, a bearing of this type may be readily and cheaply replaced by simply holding a torch to the bearing metal between the two frames thus melting and removing it, and then forming a new bearing in the manner hereinbefore described.

In the embodiment of the invention illustrated it has been applied to a horizontally disposed drilling mechanism, but it will be readily apparent that the invention may be applied with equally good results to a vertically disposed type of mechanism. Also that a plurality of the units 10 may be arranged one on top of the other or alongside each other in any suitable staggered relation or alignment by providing suitable lubrication for the plurality of units.

What is claimed is:

1. The method of forming bearings for a plurality of closely centered rotary elements, which consists in arranging the elements upon the desired centers surrounding certain portions thereof with a bearing material applied in a molten state, allowing the material to solidify and then simultaneously producing apertures through the solidified material and flattening the rotary elements to provide means for lubricating them.

2. The method of forming bearings for a plurality of closely centered rotary spindles in driving engagement one with the other at a point intermediate their ends, which consists in arranging the spindles upon the desired centers, surrounding the portions thereof at either side of the point of driving engagement with a bearing material applied in a molten state, and then allowing the material to solidify.

3. The method of forming bearings for a plurality of closely centered rotary spindles in driving engagement one with the other at a point intermediate their ends, which consists in arranging each of the spindles at a plurality of points upon the desired centers, surrounding the portions thereof at either side of the point of driving engagement with a bearing material applied in a molten state leaving the point of driving engagement of the spindles exposed, and then allowing the material to solidify.

4. A bearing for multiple drill spindles arranged upon close centers and in driving engagement one with the other at a portion intermediate the bearing portions, comprising an inner frame surrounding the portions of the spindles in driving engagement and spaced therefrom, an outer frame surrounding the inner frame and the bearing portions of the spindles and spaced from the inner frame, and a mass of bearing material surrounding the spindles within the space between the two frames and extending from one bearing portion to the other, said bearing material applied in a molten state.

5. A bearing for multiple drill spindles arranged upon close centers and carrying intermeshing driving gears intermediate their ends, comprising an inner frame spaced from and extending around the driving gears, an outer frame spaced from and extending therearound, said frames designed at their ends to center the spindles, and a mass of bearing material surrounding the spindles within the space between the two frames and extending from end to end of the spindles, said bearing material applied in a molten state.

6. A bearing for a multiple drill mechanism having a plurality of spindles and gears carried upon the spindles for driving one spindle from another, comprising a common cast portion surrounding the spindles at either end thereof and extending therebetween, said portion being provided with an aperture within which the gears are located.

7. A bearing for a multiple drill mechanism having a plurality of spindles in driving engagement one with the other at a portion intermediate their ends, comprising a common mass applied in a molten state surrounding the spindles at separated portions and extending across the point of driving engagement of the spindles along two opposed surfaces thereof, and means for permitting lubrication of each spindle associated with the bearing.

8. A bearing for a plurality of rotatable members arranged upon close centers and carrying intermeshing driving gears between the ends of the bearing, comprising a frame of predetermined shape, and an integral mass of cast material therein separated from the gears.

In witness whereof, I hereunto subscribe my name this 23d day of October, A. D. 1925

STANLEY EDWARD BOYNTON.